(12) United States Patent
Chamberlain

(10) Patent No.: US 7,688,863 B2
(45) Date of Patent: Mar. 30, 2010

(54) METHODS AND APPARATUS FOR SHARING NETWORK BANDWIDTH

(75) Inventor: Robert L. Chamberlain, Raleigh, NC (US)

(73) Assignee: Renesas Technology America, Inc., San Jose, CA (US)

(*) Notice: Subject to any disclaimer, the term of this patent is extended or adjusted under 35 U.S.C. 154(b) by 1267 days.

(21) Appl. No.: 10/253,711

(22) Filed: Sep. 25, 2002

(65) Prior Publication Data

US 2003/0076855 A1    Apr. 24, 2003

Related U.S. Application Data

(60) Provisional application No. 60/335,057, filed on Oct. 19, 2001.

(51) Int. Cl.
 *H04J 3/06* (2006.01)
(52) U.S. Cl. .................. 370/504; 370/528; 370/538; 370/543
(58) Field of Classification Search .............. 370/232, 370/235, 428, 447, 504, 528, 543, 540, 544, 370/538, 230.1, 395.2, 395.21, 395.3, 395.4
See application file for complete search history.

(56) References Cited

U.S. PATENT DOCUMENTS

| | | | |
|---|---|---|---|
| 4,719,458 A * | 1/1988 | Miesterfeld et al. ......... 710/240 |
| 4,771,391 A | 9/1988 | Blasbalg |
| 4,979,100 A | 12/1990 | Makris et al. |
| 5,050,161 A | 9/1991 | Golestani |
| 5,050,162 A | 9/1991 | Golestani |
| 5,341,374 A | 8/1994 | Lewen et al. |
| 5,446,735 A * | 8/1995 | Tobagi et al. ............... 370/445 |
| 5,617,419 A * | 4/1997 | Christensen et al. ........ 370/471 |
| 5,663,951 A | 9/1997 | Danneels et al. |
| 5,717,861 A | 2/1998 | Rabii |
| 5,734,825 A | 3/1998 | Lauck et al. |
| 5,784,569 A | 7/1998 | Miller et al. |
| 5,854,900 A | 12/1998 | Kalkunte et al. |
| 5,894,559 A | 4/1999 | Krishna et al. |
| 5,903,735 A | 5/1999 | Kidder et al. |
| 5,936,940 A | 8/1999 | Marin et al. |
| 5,982,778 A * | 11/1999 | Mangin et al. ............. 370/445 |
| 6,031,821 A | 2/2000 | Kalkunte et al. |
| 6,032,189 A | 2/2000 | Jinzenji et al. |
| 6,055,578 A | 4/2000 | Williams et al. |
| 6,085,221 A | 7/2000 | Graf |
| 6,108,306 A * | 8/2000 | Kalkunte et al. ............ 370/235 |

(Continued)

*Primary Examiner*—Chi H. Pham
*Assistant Examiner*—Shick Hom
(74) *Attorney, Agent, or Firm*—Squire, Sanders & Dempsey, L.L.P.

(57) ABSTRACT

Methods and apparatus for sharing network bandwidth between devices connected to a bus are presented. Each of the devices belongs to one of a number of device classes. Each device class is associated with a respective data transfer rate at which information may be exchanged over the bus. An exemplary method includes the step of assigning a gap interval to each device based on at least the data transfer rate of the class to which the device belongs, the assigned gap interval being inserted between portions of a data stream sent by the corresponding device over the bus. The assigned gap interval may be inserted between portions of a data stream sent by the corresponding device over the bus to achieve the desired data rate resulting in an equitable sharing of bandwidth between the devices connected to the bus.

52 Claims, 3 Drawing Sheets

U.S. PATENT DOCUMENTS

| | | | |
|---|---|---|---|
| 6,118,761 A * | 9/2000 | Kalkunte et al. | 370/229 |
| 6,118,787 A * | 9/2000 | Kalkunte et al. | 370/445 |
| 6,134,596 A | 10/2000 | Bolosky et al. | |
| 6,141,327 A * | 10/2000 | Kalkunte et al. | 370/252 |
| 6,167,445 A | 12/2000 | Gai et al. | |
| 6,188,698 B1 | 2/2001 | Galand et al. | |
| 6,247,061 B1 | 6/2001 | Douceur et al. | |
| 6,285,658 B1 | 9/2001 | Packer | |
| 6,580,721 B1 * | 6/2003 | Beshai | 370/428 |
| 6,629,200 B1 * | 9/2003 | Kanamaru et al. | 711/113 |

* cited by examiner

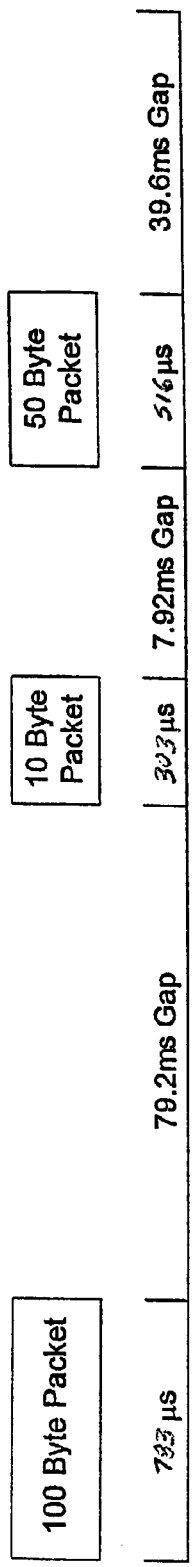
Figure 1 - Bus Timing for a 10kb/s Device
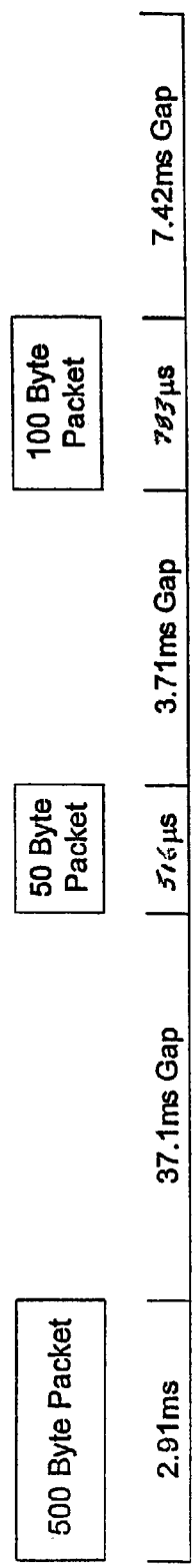
Figure 2 - Bus Timing for a 100kb/s Device
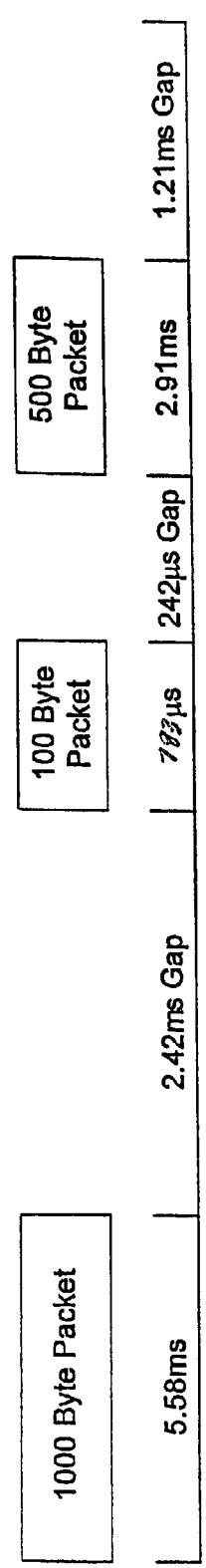
Figure 3 - Bus Timing for a 1Mb/s Device

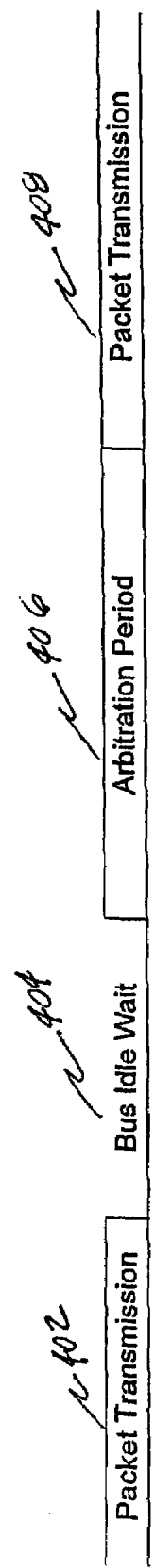
Figure 4 - Bus Access Process
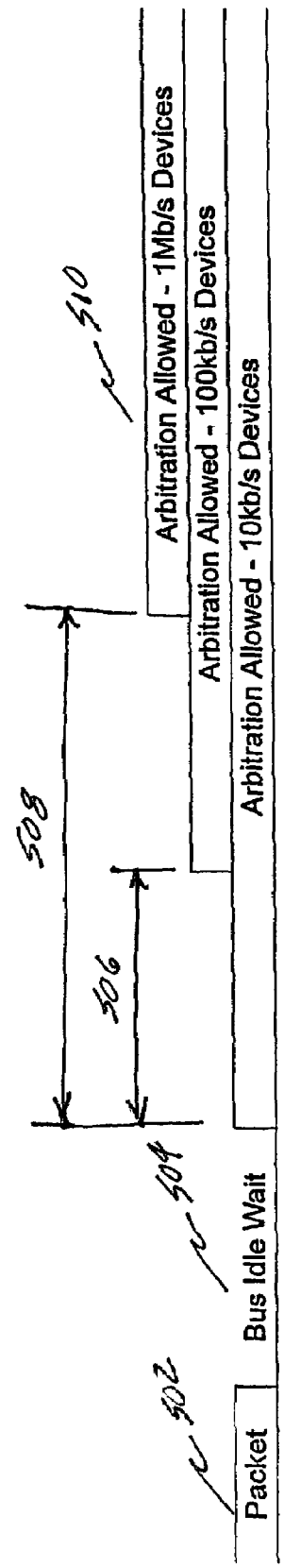
Figure 5 - Bus Access Timing

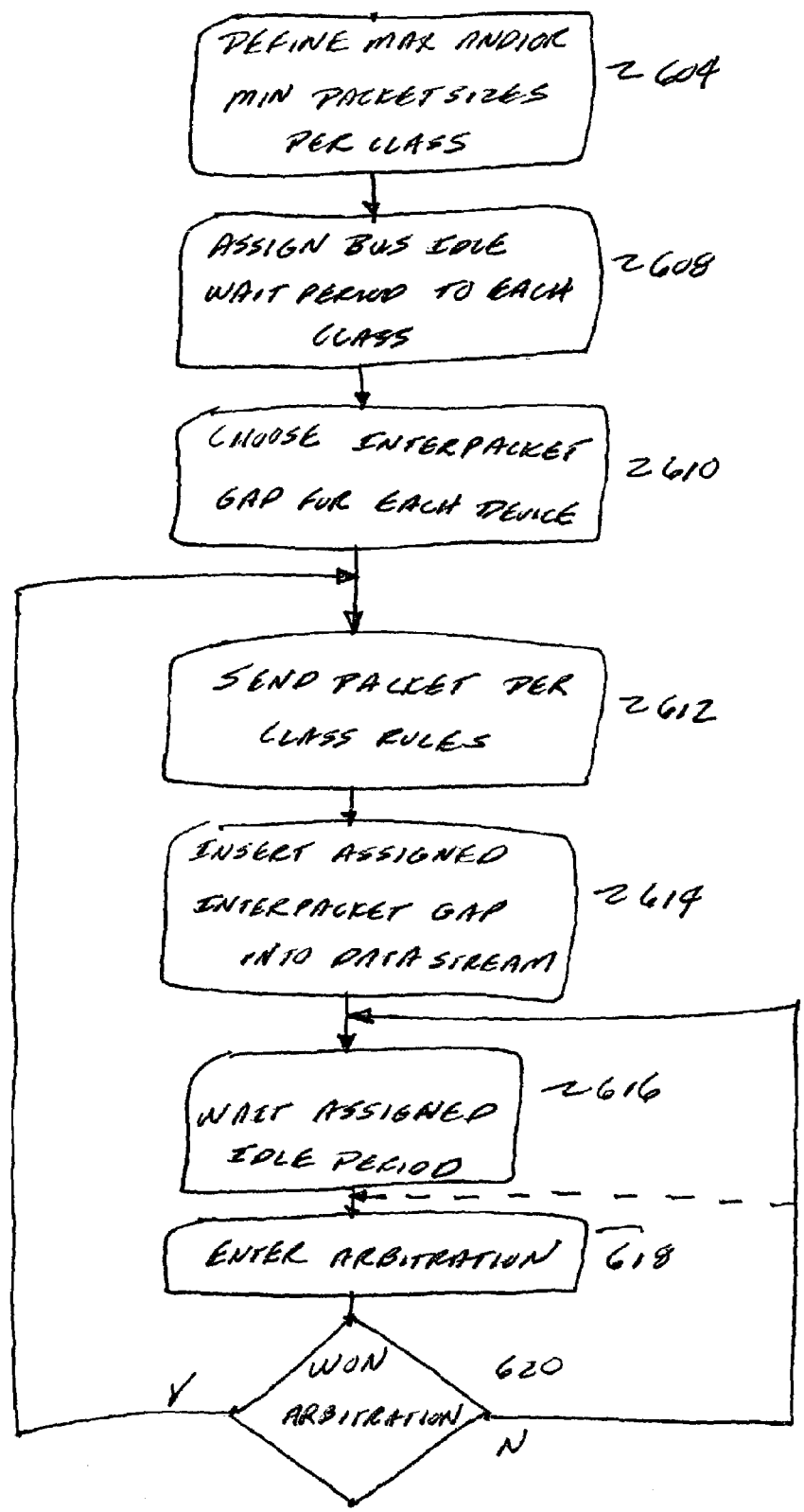

METHODS AND APPARATUS FOR SHARING NETWORK BANDWIDTH

RELATED APPLICATIONS

This application claims priority under 35 U.S.C. §119(e) to U.S. patent application No. 60/335,057, entitled "Method of Network Bandwidth Sharing", filed on Oct. 19, 2001, the entire content of which is hereby incorporated by reference.

BACKGROUND

What is described are methods and apparatus for sharing network bandwidth. In particular, methods and apparatus for sharing network bandwidth in packet switched networks between different classes of devices having equal access rights to the network are presented.

Traditional networks, such as the Public Switched Telephone Network (PSTN), are based on circuit switching technology, in which a dedicated line is allocated for transmission between two devices. Circuit switching is ideal when data must be transmitted quickly and must arrive in the same order in which it's sent. Traditionally, circuit switching technology has been used to transfer real-time data, such as live audio and video. But having dedicated connections between devices can lead to inefficiencies in the allocation and use of the overall available network bandwidth.

Packet switching can be more efficient and robust for data that can withstand some delay in transmission. Packet switched networks use protocols in which messages are divided into packets before they are sent. Each packet is then transmitted individually and can even follow different routes to its destination. Once all the packets forming a message arrive at the destination, they are recompiled into the original message. Most modern Wide Area Network (WAN) protocols, including TCP/IP, X.25, Frame Relay, and Asynchronous Transfer Mode (ATM) are based on packet switching technologies. Traditionally, packet switching has been used to transfer e-mail messages and Internet web pages, but modern protocols have evolved to the point where acceptable transfer of live audio and video information are being achieved.

Many of the networking schemes either being used or proposed for the home networking environment also utilize packet switching technology. Two of the leading schemes today are wireless (RF) and powerline carrier (PLC). The home networking environment raises unique challenges in the areas of efficient bandwidth allocation and utilization. One factor behind these challenges is that typical home networking schemes require that control and status information be transferred between devices on the network, while at the same time supporting the transfer of audio and video data between the networked devices. These different traffic types often require conflicting amounts of bandwidth. For example, certain types of traffic, such as command or response cycles, occur infrequently, but require that a certain maximum total transmission loop time be met. Other types of traffic, such as audio or video streaming, may be able to accommodate relatively long transmission gaps at irregular intervals, but must have a guaranteed average bandwidth available to them. Techniques for dynamically managing and allocating bandwidth to account for these conflicting requirements can become quite complex and time consuming.

Another factor behind the challenges of bandwidth allocation in the home networking environment is that the physical medium for the network is typically shared between a number of separate entities that may not coordinate efficiently (or equitably) in sharing the total available bandwidth. The bandwidth sharing problem is exaggerated when several devices on the network seek access to the shared medium simultaneously. This situation can lead to a momentary peak of network activity, that in turn may cause the parameters for, e.g., either sending command/response cycles or sending streaming data to be violated.

Accordingly, what is needed are techniques for "flattening" the network traffic peaks and reducing the probability that any one particular network device will not be able to perform its data transactions according to its required traffic parameters. Moreover, it would be desirable to develop techniques that will ensure the available bandwidth of the network is shared on an equitable basis, to allow both time-limited and bulk data transactions to be accomplished according to their needs.

Packet switched networks are typically designed to support the transfer of packets having a given maximum packet length, and to require a particular interpacket time gap to be placed between transmitted packets. The goal in choosing these parameters is to achieve a maximum data throughput given the physical parameters of the network medium, as well as the logical parameters of the media access control (MAC) function that manages access to the network. Typically, all network devices share these same parameters, and network access is typically granted on a non-discriminatory basis. For example, if a particular network device has one hundred Kbytes of data to transmit over the network, it may transmit this data at the maximum rate supported by the network, even if doing causes data transmission problems for other devices on the network.

Accordingly, there also exists a need for techniques that will enforce that the data transmissions of any particular network device be spread out over a longer period of time, thus reducing the level of contention with other devices needing to access the network.

U.S. Pat. No. 6,108,306 to Kalkunte et al. ("Kalkunte") describes an arrangement in which a network switch dynamically allocates bandwidth to a number of switch ports based upon the activity of network nodes connected to the ports. The switch assigns a bandwidth value to each active port based on the switch capacity and the total number of active ports. Each switch port forwards its assigned bandwidth to a corresponding network node that then calculates an interpacket gap interval based on the size of the packet being transmitted and the assigned bandwidth value. The switch port also calculates the size of the interpacket gap to determine if transmission of another data packet begins at the expiration of the calculated gap interval. If a new data packet is not received by the time the gap interval expires, the port is determined to be inactive and the switch redistributes the inactive port's bandwidth to the remaining active ports.

A drawback of Kalkunte's arrangement is that a network switch is required to control the described bandwidth allocation. Since each of the network nodes in Kalkunte's arrangement compete for network access on a more or less equal basis (Kalkunte describes that different priorities can be assigned to the different switch ports), without the network switch, each node could attempt to utilize the full network bandwidth one hundred percent of the time. This would result in a total network overload condition. Even including the functionality of the network switch, Kalkunte's arrangement does not address the problem of ensuring that both low bandwidth time-limited data transfers and high bandwidth bulk data transfers are accommodated without violating their respective network parameters, as is required in the home networking environment.

SUMMARY

Accordingly, one object is to provide techniques for reducing the probability that any one particular network device will not be able to perform its data transactions according to its required traffic parameters. Another object is to provide techniques that will ensure the available bandwidth of the network is shared on an equitable basis to allow both time-limited and bulk data transactions to be accomplished according to their needs. Still another object is to provide techniques that will ensure that the data transmissions of any particular network device be spread out over a longer period of time, thus reducing the level of contention with other devices needing to access the network. Yet another object is to provide techniques that limit the maximum bandwidth available to different classes of network nodes by assigning a respective inter-packet gap to each of the defined classes. Another object is to provide techniques that would require higher bandwidth devices to observe longer periods inactivity before attempting to access the network.

These objects are addressed by methods and apparatus for sharing network bandwidth. According to one aspect, a method of sharing bandwidth between devices connected to a bus is presented. Each of the devices belongs to one of a number of device classes that are each associated with a respective data transfer rate at which information may be exchanged over the bus. The method includes the step of assigning a gap interval to each device based on at least the data transfer rate of the class to which the device belongs, the assigned gap interval being inserted between portions of a data stream sent by the corresponding device over the bus.

According to a related aspect, the method further includes the step of defining a maximum size of the portions of the data stream sent by the corresponding device over the bus based on at least the data transfer rate of the class to which the device belongs.

According to another related aspect, the method further includes the step of defining a minimum size of the portions of the data stream sent by the corresponding device over the bus based on at least the data transfer rate of the class to which the device belongs.

According to yet another related aspect, the gap interval assigned to each device is further based on the maximum and minimum sizes of the portions of the data stream sent by the device over the bus.

According to yet another related aspect, the method further includes the step of assigning a respective bus idle wait period to each of the defined classes, the duration of which each device must wait before requesting access to the bus.

According to yet another related aspect, the method further includes the step of assigning longer bus idle wait periods to device classes having higher data transfer rates and shorter bus idle wait periods to device classes having lower data transfer rates.

According to yet another related aspect, the bus idle wait periods for device classes having higher transfer rates are assigned to allow devices belonging to device classes having lower transfer rates to transmit at least one portion of a data stream before the bus idle wait periods assigned to device classes having higher transfer rates expire.

According to yet another related aspect, the gap interval assigned to each device is further based on the bus idle wait period of the device class to which the device belongs.

According to yet another related aspect, the gap interval assigned to each device is further based on a size of a previous portion of the data stream sent by the device over the bus.

According to yet another related aspect, the method further includes the step of sending at least a portion of a data stream from the corresponding device over the bus according to transmission rules of the class to which the device belongs.

According to yet another related aspect, the transmission rules of the class to which the device belongs comprise maintaining at least one of a maximum and a minimum size of the portion of the data stream sent over the bus.

According to yet another related aspect, the method further includes the step of inserting the assigned gap interval into the data stream after sending the at least a portion of the data stream over the bus.

According to yet another related aspect, the method further includes the step of waiting a bus idle wait period assigned to the class to which the corresponding device belongs after inserting the assigned gap interval into the data stream.

According to yet another related aspect, the method further includes the step of arbitrating with other devices connected to the bus for a right to access the bus after the bus idle wait period assigned to the class to which the corresponding device belongs expires.

According to yet another related aspect, the method further includes the step of sending another portion of the data stream over the bus when the corresponding device wins the right to access the bus; and repeating the steps of inserting the assigned gap interval, waiting the assigned bus idle wait period, and arbitrating with other devices connected to the bus until all portions of the data stream are sent over the bus.

According to yet another related aspect, the method further includes the step of repeating the steps of waiting the assigned bus idle wait period and arbitrating with other devices connected to the bus when the corresponding device does not win the right to access the bus.

According to yet another related aspect, the method further includes the step of repeating the step of arbitrating with other devices connected to the bus when the corresponding device does not win the right to access the bus.

According to yet another related aspect, the gap interval assigned to each device is further based on a time associated with arbitrating with other devices connected to the bus for the right to access the bus.

According to yet another related aspect, the class to which a device belongs is based on at least the type of information the device is capable of exchanging over the bus.

According to yet another related aspect, a device belonging to a particular device class is configured to temporarily operate in another device class having a higher transfer rate when bus conditions warrant.

According to yet another related aspect, bus conditions warrant the temporary operation of the device in the other device class when at least one device belonging to the other device class is idle for a predetermined amount of time.

According to yet another related aspect, the arrangement is included in a packet switched network and the portions of the data stream sent by the device over the bus are packets.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

BRIEF DESCRIPTION OF THE DRAWINGS

The above objects, features, and advantages will become more apparent in light of the following detailed description in conjunction with the drawings, in which like reference numerals identify similar or identical elements, and in which:

FIG. 1 is a timing diagram depicting exemplary network transmissions made by a 10 Kbits/s class device;

FIG. 2 is a timing diagram depicting exemplary network transmissions made by a 100 Kbits/s class device;

FIG. 3 is a timing diagram depicting exemplary network transmissions made by a 1 Mbits/s class device;

FIG. 4 is a timing diagram illustrating a generalized exemplary bus access process;

FIG. 5 is a timing diagram illustrating an exemplary bus access process for three network device classes; and FIG. 6 is a flowchart illustrating an exemplary method for sharing bandwidth between different classes of network devices.

DETAILED DESCRIPTION

Preferred embodiments are described below with reference to the accompanying drawings. In the following description, well-known functions and/or constructions are not described in detail to avoid obscuring the description in unnecessary detail.

Applicant has discovered advantages in bandwidth sharing by defining different classes of network devices that are allowed differing amounts of the total bandwidth available on a shared medium (or bus). The bandwidth allotted to a particular class of devices is limited by forcing the devices to wait a variable amount of time between transmitting packets by adjusting the interpacket gap interval of the class. Bandwidth is further limited by specifying a maximum packet length allowed for each class, ensuring that lower bandwidth classes cannot hold the bus for an excessive amount of time. This allows data transmissions for all network devices to be conducted at the maximum data rate supported by the shared (or common) bus, thus maximizing the overall data transmission rate, while limiting the shared bandwidth available to any one particular device.

In addition, Applicant has discovered advantages in requiring that different classes of network devices wait differing amounts of time after bus activity has ceased before attempting to access or re-access the network. In particular, lower bandwidth class devices, generally used for control and status, are assigned shorter wait periods than higher bandwidth class devices before being allowed to enter bus arbitration. This better allows the lower bandwidth class devices to insert packets having command and status information into the data stream of a higher bandwidth class devices transmitting streaming audio or video information. Together, with the bandwidth limiting techniques described above, an equitable sharing of the available network bandwidth is achieved, while lowering the peak network load and providing an acceptable quality of service for all network classes.

In the following examples, particular values are used to define certain network parameters such as a maximum raw data rate of the shared bus, the varying data rates and maximum packet lengths of the different defined classes of network devices, and the bus arbitration time of the network. It will be understood that these specific values are provided for illustrative purposes only, and other values and classes may be defined to address the particular needs of a given networking environment.

Assume, for illustration purposes, a networking environment having a shared bus that is capable of carrying information at a raw data rate of 1.5 Mbits/s. Such a shared bus would be capable of supporting, e.g., three classes of network devices, defined as having maximum data rates of 10 Kbits/s, 100 Kbits/s, and 1 Mbits/s, respectively. For the 10 Kbits/s class devices, the maximum packet length may be set to, e.g., 100 bytes (8 bits per byte of information), with an 80 mS period of transmission. For the 100 Kbits/s class devices, the maximum packet length may be set to, e.g., 500 bytes with a 40 mS period, or perhaps the maximum packet length could remain at 100 bytes with an 8 ms period. Finally, the 1 Mbits/s class devices could transmit a 1000 byte packet every 8 ms, or perhaps transmit a 100 byte packet every 800 µs. The interpacket gap assigned to each class depends upon the maximum data rate of the class, the packet length, and the bus arbitration time of the network.

In many cases, the actual amount of data to be transmitted will not fit entirely within any regular, fixed packet size. In these cases, a preferred method of setting the interpacket gap is to base gap interval on the length of the last packet transmitted. In the case of the 10 Kbits/s class devices, a packet of 100 bytes would require about an 80 ms interpacket gap, while a packet size of 10 bytes would require only about an 8 ms gap to achieve the allotted bandwidth.

Network devices are assigned to the various defined classes according to their data transaction needs. For example, devices that need only send small amounts of control or status information can be assigned to the lowest bandwidth class, e.g., the 10 Kbits/s class. The 100 Kbits/s class could be reserved for devices that stream audio information, while the 1 Mbits/s class could be used by applications that support high-bandwidth video streaming. By assigning the various types of devices to the various classes based on the type of information exchanged, it can be guaranteed that each device in the network will use only that amount of total bus bandwidth allotted to it, even during peak usage times when a device might otherwise attempt to use essentially the full maximum bandwidth for a short period of time. Further, by forcing the higher bandwidth devices to wait for longer periods of bus inactivity before attempting to access the bus, the lower bandwidth devices can be guaranteed priority in accessing the bus, such that their shorter packets can be interleaved into the data flow of the higher bandwidth devices.

According to an exemplary embodiment, devices may be allowed to "jump" between classes if the bus load permits. For example, a 10 Kbits/s class device may be allowed to operate temporarily as a 100 Kbits/s device if the average bus load over a certain period of time falls below some preset limit.

FIGS. 1, 2, and 3 illustrate, by way of example only, the bus timing for three different classes of devices: a 10 Kbits/s device, a 100 Kbits/s device, and a 1 Mbits/s device. The exemplary bus is capable of operating at a raw data rate of 1.5 Mbits/s, and 250 µs is allocated for the bus arbitration process. As illustrated in each of the figures, the time in seconds required to transmit a packet of a given length is the same for all three classes of devices. The total time to transmit a packet ($T_{packet}$) is defined to include the bus arbitration time, and may be calculated according to equation:

$$T_{packet} = 250e^{-6} + (\text{\# of bytes in packet}) * 8/1.5e^{6} \qquad (1)$$

Only the interpacket gaps among the classes of devices is different.

Exemplary bus timing for a 10 Kbits/s class device is shown in FIG. 1. The maximum packet length is set, e.g., to 100 bytes. The interpacket gap interval (IG) in seconds is equal to the period of the class, minus the time required to transmit the data minus the bus arbitration time. Using the exemplary transmission parameters introduced above, the IG interval may be calculated as:

$$IG = [(Data\ Rate)^{-1} - (1.5e^6)^{-1}] * 8 * (\#\ of\ bytes\ in\ packet) - 250e^{-6} \quad (2)$$

Since the bus arbitration time will be approximately the same irrespective of the size of the packet transmitted, an IG interval per byte may be chosen for each respective class to yield the desired data rate. Thus, in FIG. 1, an IG interval of 792 µs per byte has been chosen. This gap interval yields a data rate of just over 10 Kbits/s for 100 byte packets. The data rate for 10 byte packets, the smallest packet size supported by the class, is slightly less.

The IG interval per byte for a given class should be chosen to account for the range of packet sizes supported by the class. As the packet size decreases, the bus arbitration time becomes a larger portion of the time $T_{packet}$ required to send a packet over the bus (see equation 1). At the same time, the inter-packet gap must decrease as the packet size decreases to maintain the data rate of the class. Nevertheless, some positive gap interval should be maintained between packets. Consequently, as packet sizes decrease, the maximum achievable data rate for higher bandwidth class devices becomes limited by the arbitration time of the bus.

An exemplary bus timing diagram for a 100 Kbits/s class device is shown in FIG. 2. In the exemplary timing diagram, a maximum packet length 500 bytes is chosen with a corresponding IG interval of 74.2 µs per byte. These parameters yield a data rate of just under 100 Kbits/s for transferring 500 byte packets. The data rate for 50 byte packets, the smallest packet size supported by the class, is slightly less.

Another exemplary bus timing diagram for a 1 Mbits/s class device is shown in FIG. 3. In this example, a maximum packet length 1000 bytes is chosen with an IG interval of 2.42 µs per byte. These parameters yield a data rate of 1 Mbits/s for 1000 byte packets. The data rate for 100 byte packets, the smallest packet size supported by the class, is slightly less.

FIG. 4 illustrates a generalized exemplary bus access process. After a packet has been transmitted 402, the bus remains inactive for a certain period of time. This so-called Bus Idle Wait period 404 may be set to some fixed minimum amount of time, e.g., 10 µs, to allow all nodes in the network an opportunity to recognize the inactive state of the bus. After the Bus Idle Wait period 404 expires, nodes that require access to the bus are allowed to enter into an arbitration period 406 to vie for the right to use the bus. When the arbitration period 406 has ended, the node that won the arbitration process begins to transmit a new packet 408 on the bus.

FIG. 5 is a timing diagram illustrating an exemplary bus access process for three network device classes. The figure illustrates how differing Bus Idle Wait periods 504-508 can be assigned to the different classes of devices to better ensure that the lower bandwidth class devices receive access priority over the higher bandwidth class devices. In the example shown, the Bus Idle Wait period for the 100 Kbits/s class 506 is set to twice the Bus Idle Wait period of the 10 Kbits/s class 506. Similarly, the Bus Idle Wait period for the 1 Mbits/s class 508 is set to three times the Bus Idle Wait period of the 10 Kbits/s class 506. Preferably, the Bus Idle Wait periods for the various classes 504-508 are scaled so as to ensure that lower class devices that are waiting for bus access will be able to transmit at least one packet over the bus in the time between when a higher class device has completed a packet transmission 502 and the time when the higher class device is allowed to again vie for bus access 510 to transmit another packet its stream.

Since having to wait a certain amount of time prior to entering the arbitration process will reduce the overall data rate of a given class, it will be convenient to consider the various classes as having respective class arbitration periods that are the sum of the network arbitration period and the assigned Bus Idle Wait period for the class. Morever, it will be understood that there is no guarantee that any particular device of a given class will win the arbitration process and be able to transmit additional packets. Therefore, those skilled in the art will understand that the data rates of the various assigned classes represent desired average rates of transfer, and not absolute data transfer rates.

FIG. 6 depicts a flowchart illustrating an exemplary method for sharing bandwidth between devices connected to a shared bus. Each of the devices belongs to one of number of respective device classes. The device classes are associated with respective data transfer rates at which information may be sent by the device over the shared bus.

The method begins at step 604 where at least one of a maximum and a minimum packet size is defined for each of the device classes. Next, at step 608, a Bus Idle Wait period is assigned to each of the device classes based, in part, on the differences between the assigned data rates of the classes. The Bus Idle Wait period should be assigned so as to ensure that lower bandwidth devices are capable of transmitting at least one packet during the Bus Idle Wait periods of higher bandwidth devices.

Next, at step 610, an IG interval is chosen for each device to best achieve the defined data rate for the class to which the device belongs. Each chosen IG interval should take into account any defined maximum or minimum packet size for the class, any assigned Bus Idle Wait period for the class, and the base arbitration period of the network. According to a preferred embodiment, the IG interval may vary individually among the various devices of a given class. The IG interval for a device may be dynamically changed based, in part, on the size of a last packet sent by the device. In this manner, the size of the packets included in a data stream may be varied without significantly increasing or decreasing the bandwidth used by the device in sending the stream. Often, it is desirable to vary the size of the packets in a stream to better support the format of the data forming the stream.

Once configured, information may be exchanged over the shared network by sending a packet from a device at step 612 according to the appropriate device class rules. These rules include complying with any maximum or minimum packet size requirements for the class. Next, the sending device inserts the assigned IG interval for its class into the data stream at step 614. At step 616, the sending device waits (e.g., sends no information) any assigned Bus Idle Wait period for its class. Once the Bus Idle Wait period has expired, the sending device is allowed to enter the arbitration process (if the device so desires) at step 618. If it is determined that the device has won the arbitration process at step 620, the process returns to step 612, where an additional packet is transmitted according to the class rules. If it is determined that the device has not won the arbitration process at step 618, the process may return to step 616, where the device is forced to again wait its assigned Bus Idle Wait period before re-entering arbitration. Alternatively, the device may be allowed to immediately re-enter the arbitration process at step 618.

As described above, when network conditions warrant, lower bandwidth class devices may be allowed to temporarily operate in a higher device classes. To support such functionality, one could add a step 612a (not shown( before step 612 in which a device of a particular class requests to be temporarily moved to a higher class. If network conditions will support the change, the device can be moved to a higher bandwidth class prior to sending a packet at step 612. A test for determining whether the network will support the temporary class change may whether a number of devices of the requested class are idle at the time of the request. Of course, more sophisticated methods of analyzing the current bandwidth utilization of the bus, and then temporarily assigning devices to higher bandwidth classes based on the determined bandwidth utilization may be employed.

It will be appreciated that the steps of the methods illustrated above may be readily implemented either by software that is executed by a suitable processor or by hardware, such as an application-specific integrated circuit (ASIC).

Various aspects have been described in connection with a number of exemplary embodiments. To facilitate an understanding of these embodiments, many aspects were described in terms of sequences of actions that may be performed by elements of a computer system. For example, it will be recognized that in each of the embodiments, the various actions could be performed by specialized circuits (e.g., discrete logic gates interconnected to perform a specialized function), by program instructions being executed by one or more processors, or by a combination of both.

Moreover, the exemplary embodiments can be considered part of any form of computer readable storage medium having stored therein an appropriate set of computer instructions that would cause a processor to carry out the techniques described herein. Thus, the various aspects may be embodied in many different forms, and all such forms are contemplated to be within the scope of what has been described. For each of the various aspects, any such form of embodiment may be referred to herein as "logic configured to" perform a described action, or alternatively as "logic that" performs a described action.

Although various exemplary embodiments have been described, it will be understood by those of ordinary skill in this art that these embodiments are merely illustrative and that many other embodiments are possible. For example, each of the exemplary embodiments have been described to operate in connection with a packet switched network. While the described techniques may certainly be applied to packet switched networks, the described concepts are sufficiently general to be used in any network where information from various network devices is interleaved on a shared medium. With this in mind, the intended scope of the invention is defined by the following claims rather than the preceding description, and all variations that fall within the scope of the claims are intended to be embraced therein.

What is claimed is:

1. A method of sharing bandwidth between devices connected to a bus, comprising the following steps:

classifying, in a processor, each of the devices into one of a number of device classes each associated with a respective data transfer rate at which devices in that class transmit information over the bus; and assigning, in the processor, a gap interval to each device based on the data transfer rate of the class to which that device belongs, the assigned gap interval being inserted between portions of a data stream sent by the corresponding device over the bus; and sending, from the corresponding device, portions of a data stream over the bus in accordance with the gap interval assigned to the class to which the corresponding device belongs.

2. The method of claim 1, further comprising the step of:

defining, in the processor, a maximum size of the portions of the data stream sent by the corresponding device over the bus based on at least the data transfer rate of the class to which the device belongs.

3. The method of claim 2, further comprising the step of:

defining, in the processor, a minimum size of the portions of the data stream sent by the corresponding device over the bus based on at least the data transfer rate of the class to which the device belongs.

4. The method of claim 3, wherein the gap interval assigned to each device is further based on the maximum and minimum sizes of the portions of the data stream sent by the device over the bus.

5. The method of claim 1, further comprising the step of:

assigning, in the processor, a respective bus idle wait period to each of the defined classes, the duration of which each device must wait before requesting access to the bus.

6. A method of sharing bandwidth between devices connected to a bus, each of the devices belonging to one of a number of device classes each associated with a respective data transfer rate at which information is exchanged over the bus, the method comprising the steps of:

assigning, in a processor, a gap interval to each device based on at least the data transfer rate of the class to which the device belongs, the assigned gap interval being inserted between portions of a data stream sent by the corresponding device over the bus; and assigning, in the processor, longer bus idle wait periods to device classes having higher data transfer rates and shorter bus idle wait periods to device classes having lower data transfer rates, where a bus idle wait period is the duration which a device must wait before requesting access to the bus.

7. The method of claim 6, wherein the bus idle wait periods for device classes having higher data transfer rates are assigned to allow devices belonging to device classes the having the lower data transfer rates to transmit at least one portion of a data stream before the bus idle wait periods assigned to device classes having the higher data transfer rates expire.

8. The method of claim 5, wherein the gap interval assigned to each device is further based on the bus idle wait period of the device class to which the device belongs.

9. The method of claim 1, wherein the gap interval assigned to each device is further based on a size of a previous portion of the data stream sent by the device over the bus.

10. The method of claim 1, wherein the transmission rules of the class to which the device belongs comprise maintaining at least one of a maximum and a minimum size of the portion of the data stream sent over the bus.

11. The method of claim 1, further comprising the step of:

inserting, by the corresponding device, the assigned gap interval into the data stream after sending at least the portion of the data stream over the bus.

12. The method of claim 1, further comprising the step of:

waiting, by the corresponding device, a bus idle wait period assigned to the class to which the corresponding device belongs after inserting the assigned gap interval into the data stream.

13. The method of claim 12, further comprising the step of:

arbitrating, by the corresponding device, with other devices connected to the bus for a right to access the bus after the bus idle wait period assigned to the class to which the corresponding device belongs expires.

14. The method of claim 13, further comprising the steps of:
- sending, from the corresponding device, another portion of the data stream over the bus when the corresponding device wins the right to access the bus; and
- repeating the steps, by the corresponding device, of inserting the assigned gap interval, waiting the assigned bus idle wait period, and arbitrating with other devices connected to the bus until all portions of the data stream are sent over the bus.

15. The method of claim 13, further comprising the step of:
- repeating the steps, by the corresponding device, of waiting the assigned bus idle wait period and arbitrating with other devices connected to the bus when the corresponding device does not win the right to access the bus.

16. The method of claim 13, further comprising the step of:
- repeating the step, by the corresponding device, of arbitrating with other devices connected to the bus when the corresponding device does not win the right to access the bus.

17. The method of claim 13, wherein the gap interval assigned to each device is further based on a time associated with arbitrating with other devices connected to the bus for the right to access the bus.

18. The method of claim 1, wherein the class to which each device belongs is based on at least the type of information the device is capable of exchanging over the bus.

19. The method of claim 1, wherein a device belonging to a particular device class is configured to temporarily operate in another device class having a higher data transfer rate when bus conditions warrant.

20. The method of claim 19, wherein bus conditions warrant the temporary operation of the device in the other device class when at least one device belonging to the other device class is idle for a predetermined amount of time.

21. The method of claim 1, wherein the bus is included in a packet switched network and the portions of the data stream sent by the corresponding device over the bus are packets.

22. A shared bandwidth network arrangement, comprising:
- a bus;
- a plurality of devices connected to the bus, each device belonging to a respective device class associated with a respective data transfer rate at which devices in the class transmit information over the bus; and
- a gap interval assignor configured to assign a gap interval to each device based on the data transfer rate of the class to which that device belongs, the assigned gap interval being inserted between portions of a data stream sent by the corresponding device over the bus.

23. The arrangement of claim 22, further comprising:
- a size limiter configured to limit a size of the portions of the data stream sent by the corresponding device over the bus based on at least the data transfer rate of the class to which the device belongs.

24. The arrangement of claim 22, further comprising:
- an idle wait assignor configured to assign a respective bus idle wait period to each of the defined classes, the duration of which each device must wait before requesting access to the bus.

25. A shared bandwidth network arrangement, comprising:
- a bus;
- a plurality of devices connected to the bus, each device belonging to a respective device class associated with a respective data transfer rate at which information is exchanged over the bus;
- a gap interval assignor configured to assign a gap interval to each device based on at least the data transfer rate of the class to which the device belongs, the assigned gap interval being inserted between portions of a data stream sent by the corresponding device over the bus; and an idle wait assignor is configured to assign longer bus idle wait periods to device classes having higher data transfer rates and shorter bus idle wait periods to device classes having lower data transfer rates, where a bus idle wait period is the duration which a device must wait before requesting access to the bus.

26. The arrangement of claim 24, wherein the gap interval assign or is configured to further base the assignment on the bus idle wait period of the device class to which the device belongs.

27. The arrangement of claim 22, wherein the gap interval assignor is configured to further base the assignment on the bus idle wait period of the device class to which the device belongs.

28. The arrangement of claim 22, wherein each device comprises:
- a transmitter that sends at least a portion of a data stream over the bus according to transmission rules of the class to which the device belongs.

29. The arrangement of claim 28, wherein the transmission rules of the class to which the device belongs comprise maintaining at least one of a maximum and a minimum size of the portion of the data stream sent over the bus.

30. The arrangement of claim 28, wherein each device further comprises:
- an idle waiter configured to wait a bus idle wait period assigned to the class to which the device belongs after the gap interval inserter inserts the assigned gap interval into the data stream.

31. The arrangement of claim 28, wherein each device further comprises:
- an idle waiter configured to wait a bus idle wait period assigned to the class to which the device belongs after the gap interval inserter inserts the assigned gap interval into the data stream.

32. The arrangement of claim 31, where each device further comprises:
- an arbitrator configured to arbitrate with other devices connected to the bus for a right to access the bus after the idle waiter finishes waiting the bus idle wait period assigned to the class to which the device belongs.

33. The arrangement of claim 32, wherein the transmitter is configured to send another portion of the data stream over the bus when the device wins the right to access the bus.

34. The arrangement of claim 22, wherein a device belonging to a particular device class is configured to temporarily operate in another device class having a higher data transfer rate when bus conditions warrant.

35. The arrangement of claim 22, wherein the arrangement is included in a packet switched network and the portions of the data stream sent by the device over the bus are packets.

36. A network device, comprising:
- a transmitter configured to send a data stream over a shared bus at a data transfer rate associated with a respective class of devices to which the network device belongs, wherein each of a plurality of classes has a different respective data transfer rate at which devices in that class send data over the shared bus;
- a gap interval inserter configured to insert an assigned gap interval into the data stream after the transmitter sends at least a portion of the data stream over the bus, the assigned gap interval being based on the data transfer rate of the class of devices to which the network device belongs;

an idle waiter configured to wait a respective bus idle wait period assigned to the class of devices to which the network device belongs after the assigned gap interval is inserted into the data stream; and an arbitrator configured to arbitrate with other devices connected to the shared bus for a right to access the shared bus when another portion of the data stream is to be sent over the shared bus, the arbitration beginning after the expiration of the bus idle wait period assigned to the class of devices to which the network device belongs.

37. The network device of claim 36, wherein the assigned gap interval is further based on a size of a previous portion of the data stream sent by the network device over the shared bus.

38. The network device of claim 36, wherein the idle waiter is configured to wait a longer period when the network device belongs to a class of devices having a higher data transfer rate and is configured to wait a shorter period when the network device belongs to a class having a lower data transfer rate.

39. The network device of claim 36, wherein the network device is included in a packet switched network and the at least a portion of the data stream sent by the network device over the shared bus are packets.

40. The method of claim 1,
wherein the gap interval is inserted between data packets sent by the corresponding device, and
wherein each data packet is individually transmitted to its destination.

41. The shared arrangement of claim 22,
wherein the gap interval is inserted between data packets sent by the corresponding device, and
wherein each data packet is individually transmitted to its destination.

42. The network device of claim 36,
wherein the gap interval inserted is configured to insert the assigned gap interval between data packets sent by the network device, and
wherein each data packet is individually transmitted to its destination.

43. A method of transmitting data packets, comprising:
determining, in the processor, a class, among a plurality of device classes, to which the device belongs, wherein each class is differentiated based on data transfer
determining, in the processor, a bus idle wait period of the device based on the class of the device, wherein the bus idle wait period is a time duration that the device must wait after bus activity has ceased before requesting access to the bus
transmitting, using a device connected to a bus, a data packet, wherein the data packet is capable of being individually transmitted to its destination; and
determining, in a processor, a gap interval based on a size of the data packet transmitted, wherein a duration of the gap interval is a time duration that the device must wait before transmitting another data packet.

44. The method of claim 43, wherein the gap interval increases as the size of the transmitted data packet increases.

45. The method of claim 43, wherein the bus idle wait period is longer for a class of devices with a higher data transfer rate and shorter for a class of devices with a lower data transfer rate.

46. The method of claim 43, further comprising:
allowing, by the processor, the device to temporarily operate as a device of a class with a higher data transfer rate when a predetermined bus condition is met.

47. The method of claim 46, wherein the predetermined bus condition is met when an average load on the bus for a predetermined duration of time is below a predetermined load threshold.

48. A method of transmitting data packets, comprising:
transmitting, using a device connected to a bus, a data packet, wherein the data packet is capable of being individually transmitted to its destination;
waiting an idle bus wait period of the device;
requesting an access to the bus for the device after waiting the idle bus wait period; and
transmitting another data packet using the device over the bus after the access to the bus is granted for the device,
wherein the idle bus wait period of the device is based on a class, among a plurality of classes, of devices to which the device belongs, the plurality of classes being differentiated based on data transfer rates, and
wherein the idle bus wait periods for different classes are different.

49. The method of claim 48, wherein the bus idle wait period is longer for a class of devices with a higher data transfer rate and shorter for a class of devices with a lower data transfer rate.

50. The method of claim 48, further comprising:
allowing the device to temporarily operate as a device of a class with a higher data transfer rate when a predetermined bus condition is met.

51. The method of claim 50, wherein the predetermined bus condition is met when an average load on the bus for a predetermined duration of time is below a predetermined load threshold.

52. A method of sharing bandwidth between devices connected to a bus, comprising the following steps:
classifying, in a processor, each of the devices into one of a number of device classes each associated with a respective data transfer rate at which devices in that class transmit information over the bus;
assigning, in the processor, a gap interval to each device based on the data transfer rate of the class to which that device belongs, the assigned gap interval being inserted between portions of a data stream sent by the corresponding device over the bus, wherein the gap interval is equal to a period of the class, minus a time required to transmit data, minus a bus arbitration time;
forcing, by the processor, higher bandwidth devices to wait for longer periods of bus inactivity before attempting to access the bus so that lower bandwidth devices can be interleaved into the data flow of the higher bandwidth devices; and
allowing, by the processor, devices to jump between classes if an average bus load over a certain period of time falls below a preset limit.

* * * * *